Patented Aug. 31, 1926.

1,597,796

UNITED STATES PATENT OFFICE.

JOSEPH HIDY JAMES, OF PITTSBURGH, PENNSYLVANIA, ASSIGNOR TO CLARENCE P. BYRNES, TRUSTEE, OF SEWICKLEY, PENNSYLVANIA.

PROCESS OF MAKING LOW-BOILING HYDROCARBONS FROM PETROLEUM OR OTHER OILS.

No Drawing.     Application filed November 13, 1919. Serial No. 337,705.

In my copending application, Serial No. 435,355, filed January 26, 1921, for partial combustion methods for treating aliphatic hydrocarbons I have described partial combustion processes for forming aldehydes, aldehyde acids, aldehyde acid anhydrides, aldehyde acid waxes, and aldehyde alcohols from open chain hydrocarbons of petroleum, the products of bituminous shale distillation, or the products of low temperature distillation of coal, or their distillates.

In said process, hydrocarbons are vaporized, mixed with air or oxygen-containing gas in regulated proportions near the theoretical combining proportion, and preferably in excess thereof; and the mixture is passed, with or without the addition of a diluting gas, such as steam, through a layer or successive layers of catalytic material under a regulated temperature below a red heat. The catalysts employed are preferably complex oxides or compounds of metals having a varying valence, such for example, as blue oxides of molybdenum or the oxides of vanadium or uranium. The products of this method are then condensed, giving a mixture of partial oxidation products, usually ranging from alcohols through aldehydes to aldehyde fatty acids. The process may be varied to produce a greater or less proportion of the aldehyde fatty acids and a greater or less proportion of the aldehydes. Such process is disclosed in my copending application, Serial No. 272,567, filed January 22, 1919.

I have discovered on further experimentation that these compounds, which can be very easily and cheaply prepared by partial oxidation or partial combustion methods described in my pending applications, are susceptible of certain decompositions which result in the formation of hydrocarbons of lower molecular weight from any hydrocarbons of higher molecular weight and higher boiling points, through a treatment of the intermediate partial oxidation products.

In carrying out my new method, I subject the product mixture of my partial combustion method as applied to aliphatic hydrocarbons, and which mixture usually contains aldehyde fatty acids and their waxes and anhydrides with some aldehydes and alcohols; to a thermal-decomposition, preferably in connection with a catalyst, this action also usually resulting in a breaking in two of the hydrocarbon chains.

In carrying out my method, I preferably subject the vapors of the mixture to a temperature above 450° C., usually combined with steam, and preferably subject the steam vapor mixture to the action of contact material.

The contact substances which I prefer in carrying out the process are metals of low atomic volume, such as nickel, copper or iron. When using steam, for example, at the temperatures best suited for these reactions, metals such as iron are partly oxidized by the steam, with their formation of hydrogen. However, this reaction is reversible so that there is always enough metal present to act as a catalyst. In addition the hydrogen formed reacts with the olefins formed, to change them into saturated hydrocarbons. Under this treatment, part of the partial oxidation products break down, probably in accordance with the following equations:

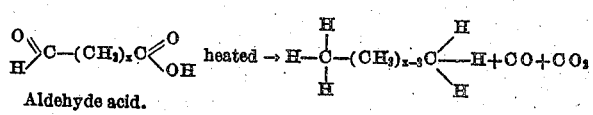
Aldehyde acid.

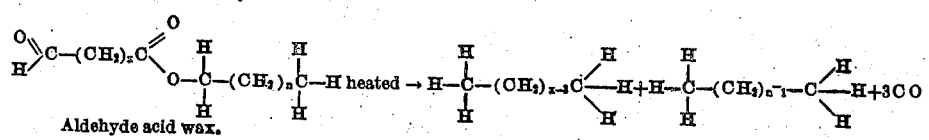
Aldehyde acid wax.

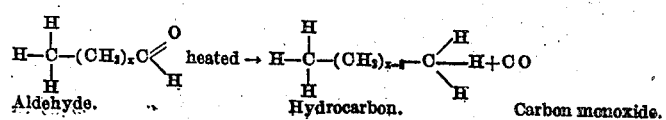
Aldehyde.     Hydrocarbon.     Carbon monoxide.

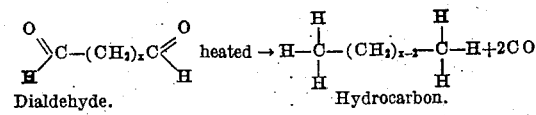
Dialdehyde.   Hydrocarbon.

With the aldehyde acids, waxes and dialdehydes the above decompositions can also be accompanied (where the molecular weight is high) by a simultaneous breaking in two of the hydrocarbon chain. For example:

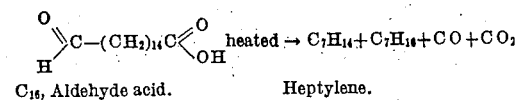
$C_{16}$ Aldehyde acid.   Heptylene.

With aliphatic alcohols the following decomposition takes place:

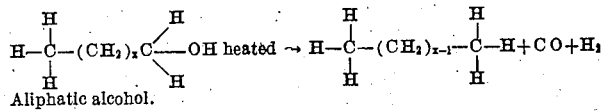
Aliphatic alcohol.

And with an aldehyde alcohol the following:

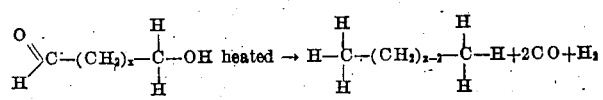

In actual practice the decompositions proceed to some extent further than I have indicated above, as I always obtain certain hydrocarbons, particularly olefins in the gas mixtures formed.

I wish also to note that the above decompositions actually take place to a certain extent at the time of the oxidation process itself. This is due to the fact that the above compounds are necessarily subjected to a high temperature at the moment of formation.

This decomposition, which takes place to some extent at the time of the partial oxidation process, can be increased in several different ways. For example, the depth of the catalytic layer used in that process may be increased so that after the formation of the intermediate oxidation products, they will, by further contact with catalytic material while in the hot condition, decompose to a considerable extent. Or I may introduce in the oxidation apparatus another catalytic screen beyond the first screen and use for the second screen either the catalyst or compounds herein referred to, in both cases utilizing the heat already present in the vapor.

Again, the vapor may be brought to higher temperature for passing through the second or decomposition screen, by introducing heat through an electric grid or otherwise, this heat being applied either between the screens or in the second screen.

In this way and various other ways, I may thus greatly increase the amount of low-molecular-weight hydrocarbons obtained in the original process.

I have also found by extended experimenting that I can obtain better results in producing lower boiling point hydrocarbons in this manner by using, in addition to the contact metals above noted, a basic oxide, preferably magnesium oxide. In the presence of steam, the aldehyde acids react with this oxide to form corresponding magnesium salts. As I preferably carry out the reaction above 450 C., these salts probably exist only momentarily and are probably at once broken into ketones; the ketones in turn being probably broken down (aided by the catalytic activity of the metal or metals present) to carbon monoxide and hydrocarbons of lower molecular weight than the bodies introduced in the process. It should be noted that the steam in conjunction with the basic oxide brings about the saponification of the waxes present, the aldehyde fatty acids thus liberated undergoing the decompositions as outlined above.

The foregoing actions of the basic oxide may probably be illustrated by the following equations:

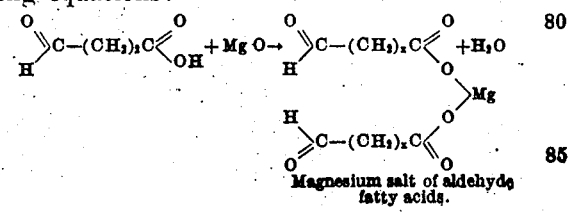
Magnesium salt of aldehyde fatty acids.

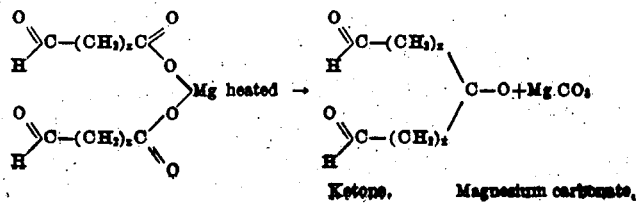
Ketone.   Magnesium carbonate.

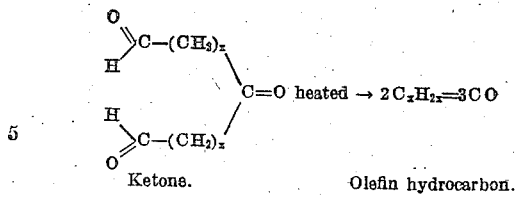

Ketone.   Olefin hydrocarbon.

Where magnesium oxide is used, for example, as the contact material, I believe that the aldehyde acids are converted into salts, and these salts decomposed with removal of carbon.

I may use metals or basic oxides, or mixtures of both, at a high decomposition temperature. If basic oxides are used, I preferably use those whose carbonates decompose at the temperature employed.

It will be seen from the above disclosures that the total effect of breaking down these partial oxidation mixtures of aliphatic bodies is to form hydrocarbons of lower molecular weight than the hydrocarbons from which the partial oxidation products were originally made. Using this process I have prepared from kerosene a mixture of hydrocarbons, part of which fall within the gasolene range. Likewise, I can prepare from gas oil a mixture, part of which comes within the kerosene range. It is evident that by using the process on hydrocarbons of any molecular weight I can "step down" a part of the partial combustion products thereof to hydrocarbons of lower or less molecular weight; and by repeating the operation I can again produce hydrocarbons of still lower molecular weight.

My experiments show that on passing a given partial combustion product mixture through the process, the breaking down action takes place to even a greater degree than that outlined in the above theory. For example, starting with kerosene and subjecting it to the partial combustion process, and then to the present process, I obtain in addition to the gasolene content some gaseous hydrocarbons; and starting with gas oil in a similar way, in addition to the kerosene content, I obtain a certain amount of gasolene and some gaseous hydrocarbons. Thus, starting with a petroleum distillate, the vapor of the petroleum distillate mixed with air will be subjected to the partial combustion or the partial oxidation process of my copending applications. As stated above, there will be some incidental decomposition of the products in this process itself. The volatile or low molecular weight hydrocarbons formed in such process may be distilled off, and if desired the partial oxidation process may be repeated to increase the content of aldehyde fatty acids and other intermediate oxidation products. Now, if the remaining heavy hydrocarbons are again passed through the original partial oxidation process, the reactions are substantially the same as with the original process, with one exception. The heavier olefin hydrocarbons form to some extent as a result of decomposition of the present process, and these on oxidation in the original process react in a different manner, the oxygen attacking the double bond, breaking the open chain at that point, as shown in the following equation:

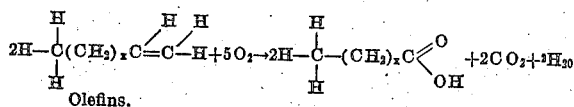

Olefins.

It will be noted that on the whole there is a more rapid elimination of carbon on the second passage through the process, due to this olefin oxidation and subsequent decomposition.

I will now describe certain examples of the complete process:

1. The raw material kerosene, known in the market as Pittsburgh lamp oil, gave the following results on Engler distillation:

| | Per cent. |
|---|---|
| Below 200° C | 0.0 |
| Below 260° C | 46.0 |
| Below 300° C | 54.0 |

In the first step the oil was subjected to the partial oxidation process of my co-pending applications under the following conditions:

Temperature of the catalyst above 320° C.
Air feed—300 cubic feet per hour.
Oil feed—9.5 liters per hour.
Diameter of circular catalytic screen—15 inches.
Thickness of catalytic screen—1 centimeter.

The product obtained was 86.8% by volume of the oil fed showing the following on Engler distillation:

| | Per cent. |
|---|---|
| Below 100° C | 1.0 |
| Below 150° C | 6.0 |
| Below 200° C | 14.0 |

In the second step this oxidation product was subjected to thermal treatment in the presence of magnesium carbonate, in a furnace of 6" diameter, the layer of magnesium carbonate being 2" thick. The partial oxidation product was fed into the apparatus at the rate of 80 cubic centimeters per hour. No steam was used and the temperature of the magnesium carbonate was about 495° C. The total amount of oil fed was 200 cubic centimeters, the amount recovered 112 cubic centimeters, giving a yield of 56%. On Engler distillation, this product showed the following:

| | Per cent. |
|---|---|
| Below 100° C | 8 |
| Below 150° C | 28 |
| Below 200° C | 64 |

The gas formed in the process showed the following:

| | Per cent. |
|---|---|
| Carbon dioxide | 3 |
| Illuminants | 35.4 |
| Carbon monoxide | 20.5 |

2. Using the same conditions and material, except that water approximately equal to one-fourth of the oil was added uniformly with the oil as fed, I obtain the following results with a feed of 85 cubic centimeters per hour:—The total amount of oil fed was 300 cubic centimeters, the amount recovered 258 cubic centimeters, giving a yield of 86%.

On Engler distillation the product showed the following:

| | Per cent. |
|---|---|
| Below 100° C | 4 |
| Below 150° C | 11 |
| Below 200° C | 24.5 |

An analysis of the gas formed showed the following:

| | Per cent. |
|---|---|
| Carbon dioxide | 7.5 |
| Illuminants | 15.0 |
| Carbon monoxide | 8.0 |

The above distilled products consisted of low molecular weight hydrocarbons, of which olefins were present in amounts varying from 40% to 50%, together with some alcohols and aldehydes and aldehyde fatty acids, the latter in amounts up to 5%. It should be noted that one distillation over alkali or lime will remove the fatty acids, leaving a mixture that is suitable as a substitute for gasolene, as the bodies present are all combustible and sufficiently volatile for use as a motor spirit.

In the above experiment, approximately 75% is too heavy to be used as a motor spirit, and I propose to subject the heavy residues to such treatment as is outlined above, modified as desirable by the gradually changing character of the mixture.

In this way I am able, by starting with any hydrocarbon mixture or petroleum fraction, to step it down to any molecular weight desired. There are, of course, necessary gas losses, but this will be more than overcome by the gradually increased value of the product over that of the raw material, which may be distilled fractions of cheap crude oils.

I will now describe additional experiments showing the effect of using metals as catalysts in the decomposing chamber, and also showing the results produced when a heavier oil such as gas oil is used as the raw material.

3. Using metallic copper as a catalyst with the same partial oxidation product described in experiments 1 and 2, the decomposing chamber was filled with a layer of copperized asbestos and reduced copper oxide scale to a depth of two inches. The temperature was maintained at from 500 to 520° C., and the partial oxidation mixture fed in at the rate of 80 cubic centimeters per hour, along with water at the rate of 20 cubic centimeters per hour. The total oil fed was 150 cubic centimeters, the oil recovered was 100 cubic centimeters, giving a yield of 66.6%. On Engler distillation the product showed as follows:

| | Per cent. |
|---|---|
| Below 100° C | 4 |
| Below 150° C | 15 |
| Below 200° C | 32 |

The gas produced analyzed as follows:

| | Per cent. |
|---|---|
| Carbon dioxide | 4.5 |
| Illuminants | 30 |
| Carbon monoxide | 8.5 |

4. A similar run made with metallic nickel as a catalyst and without using steam gave a recovery of 52%, showing on Engler distillation the following:

| | Per cent. |
|---|---|
| Below 100° C | 1.6 |
| Below 150° C | 11.6 |
| Below 200° C | 25 |

The gas analyzed as follows:

| | Per cent. |
|---|---|
| Carbon dioxide | 7 |
| Illuminants | 5 |
| Carbon monoxide | 7 |

5. A similar run was made with catalytic iron and iron oxide in the decomposing chamber, using the same amount of water fed as material fed. In this case I obtained a recovery of 77% with Engler distillation giving the following:

| | Per cent. |
|---|---|
| Below 100° C | 2 |
| Below 150° C | 7.2 |
| Below 200° C | 16.4 |

The gas analyzed as follows:

| | Per cent. |
|---|---|
| Carbon dioxide | 11 |
| Illuminants | 19 |
| Carbon monoxide | 4 |

6. With a partial oxidation product made from gas oil with an 80% yield, showing on Engler distillation:

| | Per cent. |
|---|---|
| Below 100° C | 1.5 |
| Below 150° C | 5 |
| Below 200° C | 17 |

I subjected this product to a thermal effect with the decomposing furnace empty, without a catalyst and using a temperature of 480° to 500° C., feeding the material at 90 cubic centimeters per hour with no water. This gave a recovery of about 53.1%, showing on Engler distillation the following:

|  | Per cent. |
|---|---|
| Below 100° C | 9 |
| Below 150° C | 20 |
| Below 200° C | 44 |

The gas analysis showed:

|  | Per cent. |
|---|---|
| Carbon dioxide | 1 |
| Illuminants | 33.5 |
| Carbon monoxide | 7.4 |

7. With conditions the same as example 6, except that one-fourth as much water as partial oxidation product was fed, I obtained a recovery of over 95%, showing on Engler distillation the following:

|  | Per cent. |
|---|---|
| Below 100° C | 4 |
| Below 150° C | 10 |
| Below 200° C | 20 |

The gas analyzed showed the following:

|  | Per cent. |
|---|---|
| Carbon dioxide | 4.5 |
| Illuminants | 13.5 |
| Carbon monoxide | 7 |

8. With the same gas oil partial combustion product as used above, and magnesium carbonate in the decomposing chamber as noted in the kerosene experiments, the following results were obtained with a temperature of from 500° to 520° C., the material was fed at the rate of 80 cubic centimeters per hour, water at the rate of 20 cubic centimeters per hour, the total amount of oil mixture fed being 190 cubic centimeters, with a recovery of 74.4%. On Engler distillation the product showed as follows:

|  | Per cent. |
|---|---|
| Below 100° C | 2.5 |
| Below 150° C | 11.5 |
| Below 200° C | 23 |

The gas analyzed:

|  | Per cent. |
|---|---|
| Carbon dioxide | 9.8 |
| Illuminants | 9.9 |
| Carbon monoxide | 4.4 |

9. A further experiment which I made was as follows:

A heavy gas oil giving no distillate below 300° C. was subjected to the partial oxidation process with a double running treatment. Taking the product from the first run and passing it again through the partial combustion apparatus, the partial oxidation product thus obtained contained about 55.6% of aldehyde fatty acids and showed the following on Engler distillation:

|  | Per cent. |
|---|---|
| Below 100° C | 2 |
| Below 150° C | 8 |
| Below 200° C | 24 |

A portion of this product was distilled, setting aside the fraction below 200° C., and the residue which amounted to 76% of the original product was subjected to the present thermal decomposition process, but with a catalyzer in the decomposing chamber, consisting of a layer of 2" deep of a mixture of equal parts of magnesium carbonate and finely divided metallic iron (catalytic iron). The run was made at a temperature of 520° to 550° C., with the rate of feed of the double run residue material at 80 cubic centimeters per hour. The water was fed at the rate of 40 cubic centimeters per hour. The total amount of the product fed was 150 cubic centimeters with a recovery of 76%. On Engler distillation, the product showed the following:

|  | Per cent. |
|---|---|
| Below 100° C | 1 |
| Below 150° C | 5 |
| Below 200° C | 21.5 |

The gas analysis showed:

|  | Per cent. |
|---|---|
| Carbon dioxide | 7.4 |
| Illuminants | 1.4 |
| Carbon monoxide | 7.8 |

The partial combustion product mixture may be decomposed in other ways than by thermal-decomposition; for example, by subjecting the vapors of the mixture to an oscillating high tension electric current to break the carbon chain. Many changes may be made in the apparatus used, the steps involved, the materials used, etc., without departing from my invention, since I consider myself the first to obtain lower boiling point hydrocarbons from heavier oils through the partial oxidation treatment combined with the thermal decomposition treatment.

I claim:

1. In the treatment of hydrocarbons which already contain artificially-introduced chemically-combined oxygen, the step consisting of thermally decomposing the same.

2. In the manufacture of lower boiling point hydrocarbons from higher boiling point hydrocarbons, the steps consisting of partially oxidizing a heavier hydrocarbon at a temperature below a red heat to obtain intermediate oxidation products and thereafter thermally decomposing said products.

3. In the manufacture of lower boiling point hydrocarbons from higher boiling point hydrocarbons, the steps consisting of partially oxidizing the heavier hydrocarbons at a temperature below a red heat, condensing the resulting vapors to obtain liquid intermediate oxidation products, and then thermally decomposing said products.

4. In the treatment of a hydrocarbon which already contains artificially-introduced chemically-combined oxygen, the step consisting of subjecting said material in the vapor phase to thermal decomposition.

5. In the manufacture of lower boiling point hydrocarbons from higher boiling point hydrocarbons, the step consisting of subjecting partially oxidized hydrocarbons in the vapor phase to the action of basic oxides.

6. In the manufacture of lower boiling point hydrocarbons from higher boiling point hydrocarbons, the steps consisting in subjecting hydrocarbon vapor mixed with oxygen to a partial combustion process at a temperature below a red heat to obtain intermediate oxidation products, and decomposing said products while in vapor form.

7. In the manufacture of lower boiling point hydrocarbons from higher boiling point hydrocarbons, the steps consisting in partially oxidizing the heavier hydrocarbons at a temperature below a red heat to obtain intermediate oxidation products, separating a lighter portion of the product, and thermally decomposing the heavier portion of the product.

8. In the manufacture of lower boiling point hydrocarbons from higher boiling point hydrocarbons, the steps consisting of partially oxidizing the heavier hydrocarbons at a temperature below a red heat to obtain intermediate oxidation products, thermally decomposing said products, separating the lighter portion of the product, and subjecting the heavier portion to an oxidation treatment.

9. In the manufacture of lower boiling point hydrocarbons from higher boiling point hydrocarbons, the steps consisting of partially oxidizing the heavier hydrocarbons in the vapor phase in the presence of oxygen, condensing the vapor stream mixture, and then decomposing at least a portion of the resulting product.

10. In the treatment of hydrocarbons, the steps consisting of partially oxidizing the same while in finely divided condition, separating the lighter portion of the condensed product, subjecting the heavier portion to partial oxidation, and then thermally decomposing the same.

11. In the manufacture of lower boiling point liquid hydrocarbons from higher boiling point liquid hydrocarbons, the steps consisting of vaporizing heavier hydrocarbons, mixing the same with oxygen, passing the mixture over a catalyst, maintaining the catalyst at a temperature below a low red heat, and decomposing a portion of the products to obtain lower boiling point hydrocarbons.

12. In the manufacture of lower boiling point liquid hydrocarbons from higher boiling point liquid hydrocarbons, the steps consisting of passing a mixture of heated mineral oil vapor and air through a catalyst at a temperature below a low red heat, and thermally decomposing the heavier portion of the product.

13. In the manufacture of lower boiling point liquid hydrocarbons from higher boiling point liquid hydrocarbons, the steps consisting of passing a mixture of heated mineral oil vapor and air through a catalyst at a temperature below a low red heat, and thermally decomposing the heavier portion of the product while in vapor form.

In testimony whereof, I have hereunto set my hand.

JOSEPH HIDY JAMES.